United States Patent [19]
Aksu

[11] 3,757,219
[45] Sept. 4, 1973

[54] CIRCUIT BOARD TESTING EQUIPMENT

[76] Inventor: Akin Aksu, 739 E. 223rd St., Carson, Calif. 90745

[22] Filed: Dec. 15, 1971

[21] Appl. No.: 208,160

[52] U.S. Cl. .......................... 324/158 F, 324/158 P
[51] Int. Cl. ............................................. G01r 31/02
[58] Field of Search ................... 324/158 F, 158 P, 324/158 R, 72.5, 73 R, 73 AT, 73 PC

[56] References Cited
UNITED STATES PATENTS
3,654,585   4/1972   Wickersham .................... 324/158 F OTHER PUBLICATIONS
Brain, M. L.; "Pneumatic Contactor;" IBM Tech. Dis. Bull., Vol. 13; No. 11; Apr. 1971; pg. 3567.

*Primary Examiner*—Rudolph V. Rolinec
*Assistant Examiner*—Ernest F. Karlsen
*Attorney*—D. Gordon Angus et al.

[57]   ABSTRACT

A testing fixture for a circuit board comprises inner and outer frames movable relative to each other, the inner frame being adapted to support and hold the circuit board to be tested. An array of contact units is supported by the outer frame at a position opposite the circuit board and adapted to make contact with selected parts of the circuit board when the inner frame is moved to meet the contact units. For the purpose of moving the inner frame to meet the contact units, a peripheral region is provided between members of the inner and outer frames adapted to be pressurized by fluid and thereby force the inner and outer frames toward each other so that the contact units engage the selected parts of the circuit board.

12 Claims, 8 Drawing Figures

PATENTED SEP 4 1973 3,757,219

INVENTOR.
AKIN AKSU

BY
Argus & Mon
ATTORNEYS.

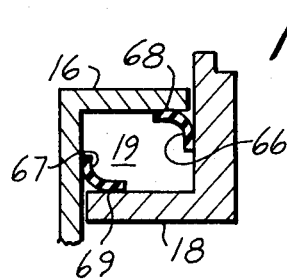
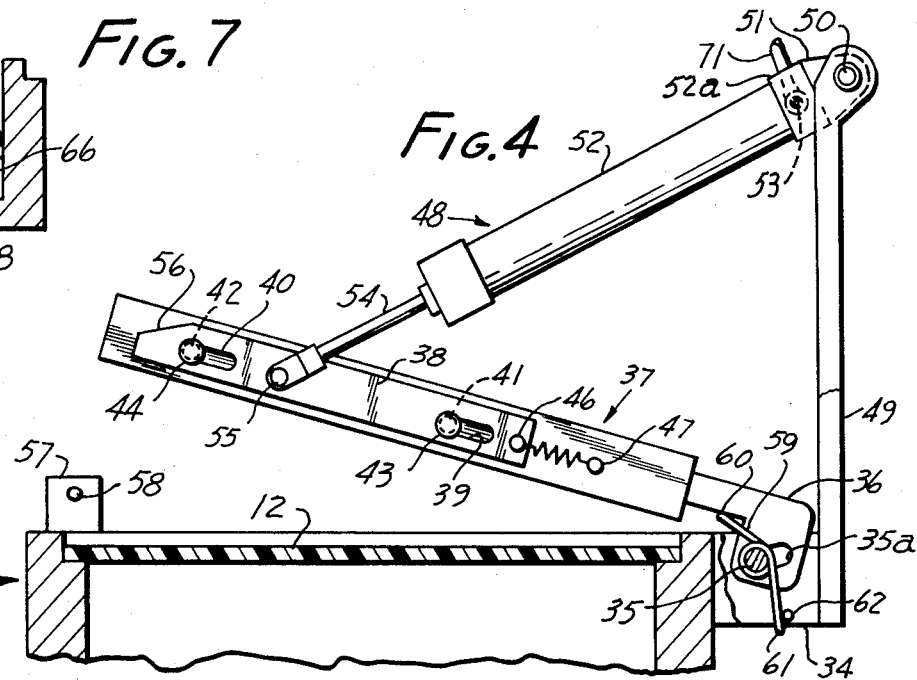
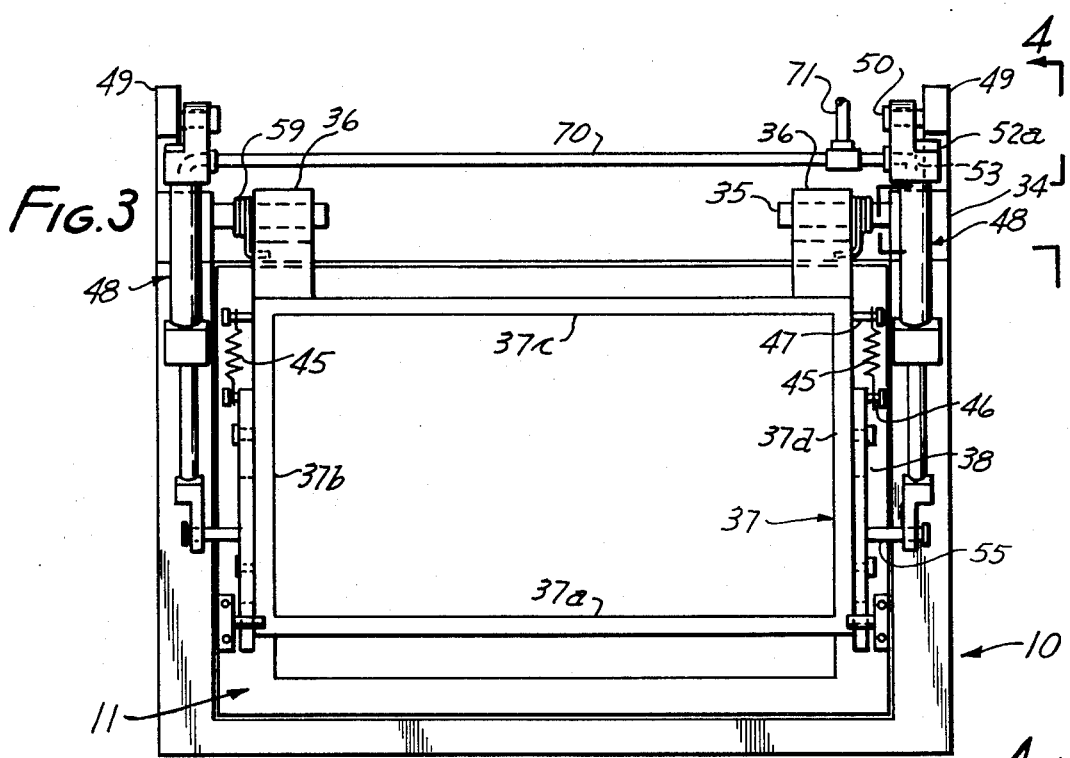
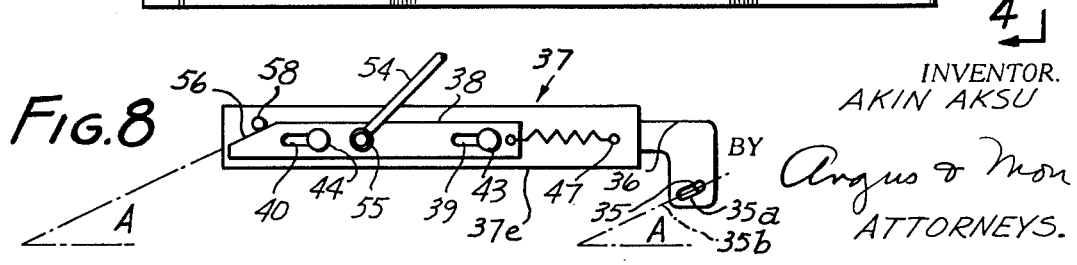

CIRCUIT BOARD TESTING EQUIPMENT

This invention relates to electrical circuit board testing equipment and more particularly to such equipment for testing electrical circuitry such as solder joints.

It has heretofore been known to mount a circuit board such as one containing a printed circuit in a frame and to mount contact units for contacting selected parts of the circuitry of the circuit board at proper positions in another frame, with provision of means for moving the two frames relative to each other so that the contact units are brought into contact with the desired parts of the circuitry. Since a circuit board ordinarily contains a multitude of points at which contact should be made, there are a corresponding number of such contact units.

A typical contact unit used for this purpose comprises a spring-biased contact member arranged to exert a substantial pressure against the corresponding part on the circuit board. There are ordinarily a great many places in the circuitry to be contacted by individual spring-pressurized contact units, and the sum of the pressures of the many contact units is very substantial. Hence the pressure by which the two frames are brought together must equal the total pressure of all the contact units. It has been the practice to apply this pressure by a suitable device such as a fluid ram, for example an air cylinder and piston arrangement.

In previously known arrangements, the pressure, as from the cylinder, has been brought to bear against the frame of the test equipment at a central position of the frame. Because of the pressure exerted by all of the large number of contact units involved, this has required a relatively large air cylinder and a relatively high air pressure, and the equipment has been cumbersome.

An object of the present invention is to provide a relatively simple equipment, requiring less air pressure and avoiding large air cylinders, as compared with prior testing equipment.

The invention is carried out by provision of an outer frame supporting the contacting units and an inner frame movable relative to the outer frame, the inner frame having a wall located within a wall of the outer frame.

According to a feature of the invention, means is provided between juxtaposed parts of the inner and outer frames for injecting fluid pressure such as pressurized air at a peripheral position of the frames. This air pressure causes relative movement between the inner and outer frames, bringing circuitry of the circuit board under test into contact with the contacting units. Since this pressure exists peripherally around the frame which supports the circuit board, relatively low fluid or air pressure is required.

The foregoing and other features of the invention will be better understood from the following detailed description and the accompanying drawings of which:

FIG. 3 is a top view showing the arrangement of FIG. 1, provided with a clamping frame above the circuit board under test;

FIG. 4 is a side elevation view partially in cross-section taken at line 4—4 of FIG. 3;

FIG. 7 shows a detail illustrating a modified form of a frame moving arrangement which may be used in place of that shown in FIG. 2; and FIG. 8 shows a detail of the clamping frame shown in FIGS. 3 and 4.

Figure 1:
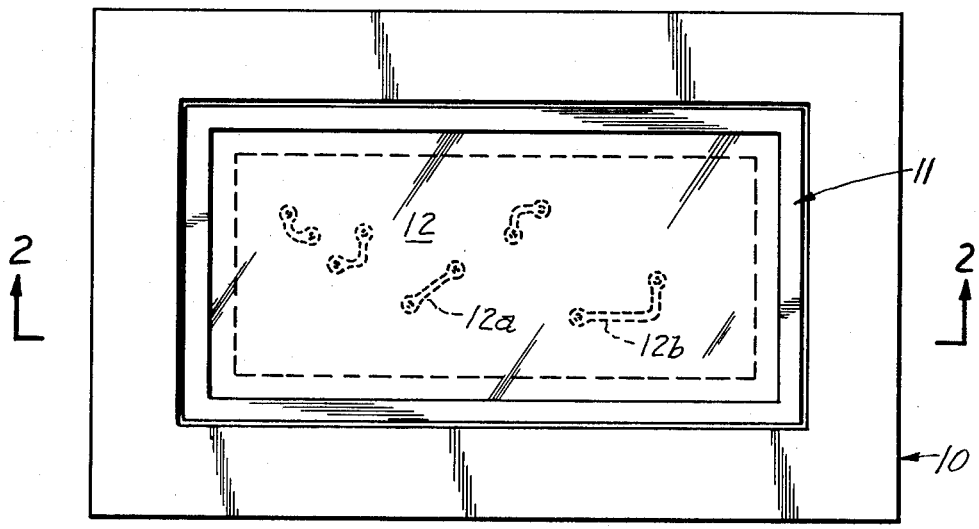
FIG. 1 is a top view of a circuit testing fixture according to this invention, showing thereon a circuit board under test and without a clamping frame on top.
Figure 2:
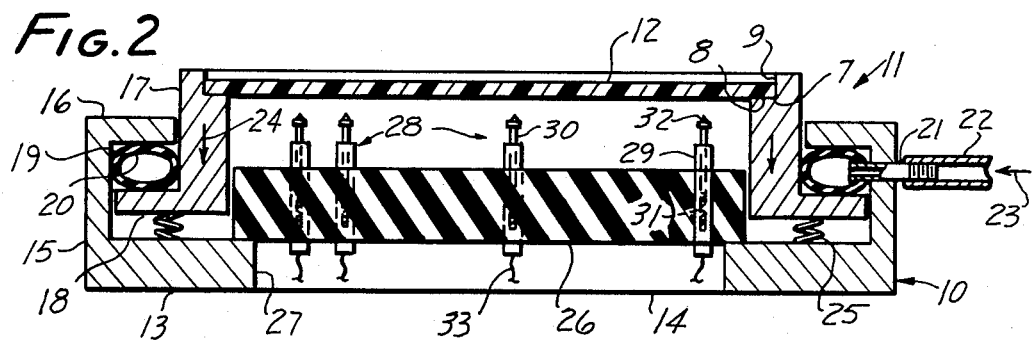
FIG. 2 is an elevational view in cross-section taken at line 2—2 of FIG. 1.

Referring to FIGS. 1 and 2, the circuit testing fixture comprises an outer frame 10 having within it an inner frame 11 movable vertically relative to the outer frame. Both the inner and outer frames are shown of rectangular shape in general conformance with the usual rectangular shape of a circuit board 12 to be tested. The circuitry may be a well-known type of printed circuit having conductive strips such as 12a and solder connections such as 12b. The outer frame 10 has a peripheral base 13 of a rectangular shape surrounding a central opening 14, also rectangular in shape, and an upstanding side wall 50 having at its top edge an inwardly protruding peripheral flange 16. The inner frame 11 has an upstanding rectangular side wall 17 which fits movably within the flange 16 and has at its lower edge an outwardly protruding flange 18 which extends to wall 15 without binding against it. Flange 18 extends around the periphery of the inner frame and is beneath and spaced from the flange 16 of the outer frame. The inner side of the top part of the side wall 17 of the inner frame has a peripheral step 7 providing a horizontal inner ledge 8 on which the peripheral edge of circuit board 12 rests. Lateral movement of the panel on the ledge is prevented by a vertical peripheral wall 9 of the step, the wall 9 preferably being deep enough so that the upper side of the circuit board does not lie above the top of side wall 17.

In the peripheral space 19 formed by the side walls 15 and 17 and flanges 16 and 18, there is an inflatable endless tube 20 which when inflated is urged to expand in its cross-section. A duct 21 passing through the side wall of outer frame 10 serves to deliver into the tube 20 an inflating fluid such as compressed air or the like, supplied by a conduit 22 from a source (not shown). When the inflating fluid is forced into the tube 20, as indicated by arrow 23, the cross section of the tube expands, and since its expansion in the lateral direction is limited by wall member 15, 16 and 17, it can only expand in the downward direction by pushing inner frame 11 downward as indicated by arrows 24. This downward movement is made against the force of compression springs 25 placed between members 13 and 18 and located at intervals around the periphery of the frames.

A platform 26 for holding contact units is supported on base member 13. Platform 26 is rectangular in shape to conform with the shape of rectangular base 13, but of somewhat larger dimensions than the dimensions of the inner wall 27 of base 13 so that the platform rests on the top of base member 13.

A number of contact units 28 are held by the platform 26, the number of which should correspond to the number of points on the circuit board at which electrical contact is to be made during the test. The contact units 28 are of a well-known type, comprising thin hollow cylinders 29 mounted upright in platform 26. Within each cylinder there is a plunger 30 in the form of a thin rod resting on a compression spring 31 between the lower end of the rod and the closed lower end of the cylinder. A contact head 32 is fixed to the upper end of the plunger and an electrical lead 33 is connected to each cylinder for connection to suitable metering or read-out apparatus. By this arrangement, there is provided electrical continuity from head 32 through the plunger and cylinder through conductor 33.

In making a test the circuit board is placed in the position in the inner frame with its circuitry downward, facing the heads of the contact units. When the tube is inflated by turning on the compressed fluid, its expansion forces the inner frame 11 downward, carrying circuit board 12 with it so that all the contact heads 32 of the contact units 28 engage respective points at the under side of the circuit board. As soon as contact is made with these points, the plungers of the many contact units are pushed downward against the force of their respective compression springs as the inner frame continues to be pushed downward to its lowermost or final position. By reason of this a firm electrical connection is made at each point. The arrangement of the contact units 28 in the platform 26 is such that there will be a contacting head at each point of the circuitry where it is desired to make electrical contact, for example for testing continuity of solder connections. Each such circuit board point is thus electrically connected to a respective lead 33 of the contacting units 28 so that when these leads are connected to suitable electrical measuring instruments the condition of proper continuity and connections of the circuit of the board is tested.

Because of the great pressure on the under side of the circuit board from the force of the springs of the large number of contact units 28, each of which contributes the force of its spring tending to push the circuit board upward, means is provided to hold the circuit board down on the ledge of the inner frame. Any suitable means may be used for this purpose. One such means is illustrated in FIGS. 3 and 4 and another such means in FIGS. 5 and 6.

Referring to FIGS. 3 and 4, there is attached to one of the long sides of inner frame 11 a pair of rearwardly protruding support members 34, one at each end of this long side. A pivot 35 is journaled through each protrusion 34. An arm 36 is fastened to each pivot 35 and a clamping frame 37 is fastened to arms 36. The clamping frame is in the form of a rectangle having four side members 37a, 37b, 37c and 37d and is dimensioned so that it fits within the inner peripheral step 7 of the inner frame and can be brought down on top of the circuit board 12 so that it binds the periphery of the circuit board against the horizontal ledge 8 of the inner frame. Each of the two shorter side members 37b and 37d of clamping frame 37 has mounted on it a sliding plate 38 each having a pair of elongated slotted openings 39 and 40 through it. A pair of pins 41 and 42 provided with respective heads 43 and 44 are passed through the respective slots 39 and 40 and secured in the respective side members 37b and 37d, such that the respective heads 43 and 44, being of larger diameter than the width of the slots, serve to retain the sliding plate 38 in place, while allowing it to slide back and forth along the respective sides of clamping frame 37. A tension spring 45 having one end secured by a pin 46 fastened to the sliding plate and the other end fastened to a pin 47 fastened to the side member of clamping frame 37 urges the sliding plate 38 toward the rear portion of arm 36 where the pivot 35 is located. The rearmost position of the sliding plate is determined by the engagement of the ends of the respective slots 39 and 40 with their respective pins 41 and 42.

The clamping frame and its sliding plates are operated by a pair of fluid rams 48 each mounted on an upstanding support 49 secured to respective support 34. At the upper end of member 49 there is provided a pivot 50 to which there is pivoted an attachment 51 securing or holding a cylinder 52 at the rear end of which there is provided a cylinder head 52a having an inlet 53 having connected to it a conduit 70 to which there is connected a conduit or hose 71 from a source of pressurized fluid such as compressed air (not shown). The conduit 70 is connected into the cylinder heads of both rams. A piston rod 54 having its forward end pivoted on a pivot 55 secured to sliding plate 38, extends into the cylinder 52 and is provided with a piston therein (not shown), such that when compression fluid is supplied to the cylinder head 52a, the piston rod 54 is urged forwardly from the cylinder to rotate the arms 36 counter-clockwise with reference to FIG. 4 and thereby bring the clamping frame down on top of the circuit board under test. When the arms 36 have rotated in the counterclockwise direction by the amount required to come down on the circuit board, the continued movement forward of the piston rod causes the sliding plate 38 to slide toward the front of frame 37 until a forward tapered portion 56 of sliding plate 38 engages beneath a detent pin 58 protruding from a member 57 secured to the inner frame.

In order that the frame 37 shall move uniformly downward against the circuit board 12 while the tapered surface 56 is moving forward beneath the detent pin, the pivot hole 35a engaged by the pivot 35 is elongated so that it moves forwardly relative to the pivot 35 while tapered surface 56 is moving forwardly relative to its detent pin. As shown in FIG. 8, the longitudinal axis 35b of the elongated hole or slot 35a, which is parallel to the upper and lower sides of the slot, makes the same angle A with the bottom surfaces 37e of the frame 37 as does the plane of tapered surface 56. Thus, forward movement of sliding plate 38 produces the same downward depression of the clamping frame at both pin 58 and pivot 35. In order to prevent any tendency for upward bulging of the circuit board 12 in its area within the inner frame 11, the frame 37 which clamps it is desirably provided with a rigid bottom over the entire area of this bottom frame, the lower surface of which is co-planar with the surface 37e.

In the normal condition when there is no circuit board held in the inner frame 11 the clamping frame rests on the inner frame. When it is desired to mount a circuit board on the inner frame, the clamping frame is raised to the position shown in FIG. 4 to permit the introduction of the circuit board, after which the clamping frame is brought down against it by the pressure of the rams. The weight of the clamping frame is at least partially balanced by the coil springs 59, the upper end 60 of which is bent to a position beneath the arm 36, and the opposite end 61 of which is held by a suitable stop 62 fixed to member 34. When the rams 48 rotate the clamping frame to clamp the circuit board, they do so against the force of springs 59.

Figure 5:
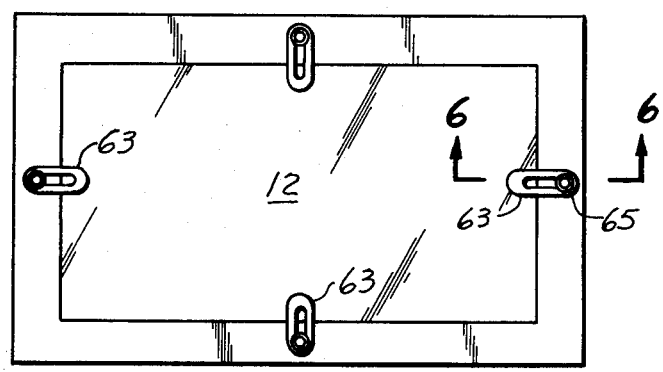
FIG. 5 shows an arrangement for clamping the circuit board in place which may be used alternatively to that shown in FIGS. 3 and 4.
Figure 6:
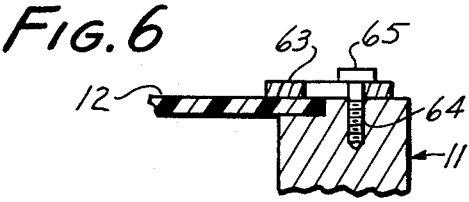
FIG. 6 shows a detail of the structure of FIG. 5.

A simpler form of clamping frame than that shown in FIGS. 3 and 4, is shown in FIGS. 5 and 6 which is a top view of the inner frame 11 having the circuit board 12 fitted within the inner peripheral step of the inner frame. The circuit board is held in place by several slidable slotted latches 63 located at intervals around the periphery of the inner frame. These latches are held by studs 64 fastened into the top of the frame 11, having heads 65 which retain the respective latches by the overlapping heads over slots 66 in the latches. By this arrangement the latches 53 are slid inwardly along studs 64 until they overlap the edges of the circuit board as shown.

Modifications within the scope of the invention may be made. For example, it is possible to modify the arrangement of endless tube 20 shown in FIG. 2, in accordance with the detail shown in FIG. 7 wherein the peripheral space 19 instead of being provided with the continuous tubular member 20 as shown in FIG. 2, is provided with seal means around space 19 as shown in FIG. 7, where compressed fluid is forced directly into the peripheral space 19. These seal means may be continuous or endless strips passing entirely around the periphery of the frame, of a resilient material such as springy rubber or the like. The strip 66 is sealed to the outer frame wall 16 at position 68 by cement or the like, and likewise the strip 67 is sealed to member 18 at position 69 by cement or the like. The portion of strip 66 which curves downwardly, and the portion of strip 67 which curves upwardly will then rub along the respective upright walls of the inner and outer frames as compressed fluid is forced into the space 19 from an inlet member 21, and the pressure will be maintained in space 19 due to the sealing effect of the members 66 and 67, as the inner and outer frames move relative to each other.

Since the inner frame in moving downward due to action of fluid pressure at the region of space 19, in the embodiments of both FIG. 2 and FIG. 7 compresses springs 25, these springs serve to push the inner frame upward relative to the outer frame when the fluid pressure is removed, which is readily done by shutting off flow of fluid into inlet 21 and then releasing it from the tube (FIG. 2) or the space 19 (FIG. 7) by a suitable outlet vent operable by a suitable valve. When the inner frame is thus pushed upward by the springs the circuit board just tested can be removed and another similar one then placed in the inner frame for a similar test. If there is to be tested a circuit board with a different form of circuitry then on a preceding board, the platform 26 will be replaced by a different platform of the same dimensions but containing a different array of contact units corresponding with the circuitry of the board to be tested.

It will be recognized that by the present invention, there is provided a means for obtaining a large amount of total pressure evenly distrubuted around the inner frame from a relatively low pressure source. This is important when it is considered that the number of plunger type contact units used in an ordinary test equipment can range from 200 to 7,000, each of which requires about four ounces of pressure to deflect its plunger. This means that 1,750 pounds of total pressure is required to deflect 7,000 contact units. This large amount of total pressure is obtainable by inflating the region around the inner frame according to the present invention, and the number of pounds per square inch of pressure required from the pressure source is relatively low. This permits the use of much less cumbersome equipment than has heretofore been possible and permits the construction of test equipment having a much lower profile and occupying less space than previous test equipment.

I claim:

1. A device for testing circuitry of a circuit board comprising: a first frame; a second frame movable relative to the first frame; means supporting said circuit board in said second frame; means supporting in said first frame pressurized contact units juxtaposed toward said circuitry; means urging the second frame to move relative to the first frame; said last-mentioned means comprising members attached to said respective frames defining a peripheral space between them, outside the circuit board and contact units, and means for sending pressurized fluid into said peripheral space to move said circuitry and contact units together against the pressure of said pressurized contact units.

2. A device according to claim 1 in which the pressurized contact units comprise spring-loaded plungers.

3. A device according to claim 1 in which means is provided for retaining fluid in said peripheral space while said pressurized fluid is sent into said space.

4. A device according to claim 1 in which the means urging the second frame to move relative to the first frame comprises a tube expandable in its cross-section when pressurized fluid is sent into said tube.

5. A device according to claim 1 in which the first frame is an outer frame and the second frame is an inner frame having a wall movable within a wall of the outer frame.

6. A device according to claim 5 in which the outer frame has a base with an upstanding wall and a lateral flange extending inwardly from the upstanding wall at a position spaced above the base, and the inner frame has an upstanding wall within said wall of the outer frame and a lateral flange extending outwardly from said last-mentioned wall at a region between said base and said inwardly extending flange.

7. A device according to claim 6 in which the means urging the inner and outer frames to move relative to each other is an endless tube adapted to be pressurized with fluid pressure and have its cross-section expanded by fluid pressure applied into it.

8. A device according to claim 3 in which the means retaining the pressurized fluid within said peripheral space comprises continuous strips sealing said space against leakage of said pressurized fluid from it.

9. Apparatus according to claim 1 in which clamping means is placed over the circuit board causing it to hold its position in the inner frame when its circuitry is in contact with said pressurized contact units.

10. A device according to claim 9 in which the clamping means comprises a clamping frame pivoted at a side of said first frame and means pivoting said clamping frame until it presses down on said circuit board.

11. A device according to claim 10 in which the clamping frame comprises frame members which bear against peripheral positions of said circuit board.

12. Apparatus according to claim 9 in which the clamping means comprises latches attached to the inner frame and slidable over the circuit board.

* * * * *

UNITED STATES PATENT OFFICE
CERTIFICATE OF CORRECTION

Patent No. 3,757,219                                    Dated  September 4, 1973

Inventor(s)  AKIN AKSU

It is certified that error appears in the above-identified patent and that said Letters Patent are hereby corrected as shown below:

Column 6, line 51          "Apparatus" should be --A device--
(Claim 9, line 1)

Column 6, line 62          "Apparatus" should be --A device--

Signed and sealed this 11th day of June 1974.

(SEAL)
Attest:

EDWARD M. FLETCHER, JR.                C. MARSHALL DANN
Attesting Officer                      Commissioner of Patents